(12) United States Patent
Houck et al.

(10) Patent No.: US 12,415,376 B2
(45) Date of Patent: Sep. 16, 2025

(54) SECURITY ARTICLE AUTHENTICATION

(71) Applicant: VIAVI Solutions Inc., Chandler, AZ (US)

(72) Inventors: William D. Houck, Santa Rosa, CA (US); Adam Scheer, Princeton, NJ (US); Markus Bilger, Santa Rosa, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 438 days.

(21) Appl. No.: 17/809,764

(22) Filed: Jun. 29, 2022

(65) Prior Publication Data

US 2023/0001733 A1 Jan. 5, 2023

Related U.S. Application Data

(60) Provisional application No. 63/217,956, filed on Jul. 2, 2021.

(51) Int. Cl.
*B42D 25/20* (2014.01)
*G06K 5/00* (2006.01)
(Continued)

(52) U.S. Cl.
CPC .............. *B42D 25/20* (2014.10); *G06K 5/00* (2013.01); *G07D 7/0034* (2017.05); *G07D 7/004* (2013.01); *G07D 7/005* (2017.05); *G07D 7/1205* (2017.05)

(58) Field of Classification Search
CPC ........ B42D 25/20; G06K 5/00; G07D 7/0034; G07D 7/004; G07D 7/005; G07D 7/1205; G07D 7/003; G07D 7/12
See application file for complete search history.

(56) References Cited

U.S. PATENT DOCUMENTS

2018/0018837 A1* 1/2018 Fankhauser ............ G07C 9/257
2019/0384955 A1* 12/2019 Frieser ................. G06T 7/0002
(Continued)

FOREIGN PATENT DOCUMENTS

WO 2017173017 A1 10/2017

OTHER PUBLICATIONS

International Search Report and Written Opinion for Application No. PCT/US2022/073304, mailed on Oct. 24, 2022, 9 pages.

*Primary Examiner* — Nay A Maung
*Assistant Examiner* — Vaisali Rao Koppolu
(74) *Attorney, Agent, or Firm* — FOLEY & LARDNER LLP

(57) ABSTRACT

A user device may cause light to be emitted at a security article by one or more light emission devices of the user device. The user device may obtain from a first set of one or more optical sensor devices of the user device first sensor data associated with the security article, and may obtain from a second set of one or more optical sensor devices of the user device second sensor data associated with the security article. The user device may determine, based on the first sensor data and the second sensor data, one or more characteristics of a security feature of the security article. The user device may determine, based on the one or more characteristics of the security feature, whether the security article is authentic. The user device may cause, based on determining whether the security article is authentic, one or more actions to be performed.

20 Claims, 8 Drawing Sheets

(51) Int. Cl.
  *G07D 7/00* (2016.01)
  *G07D 7/004* (2016.01)
  *G07D 7/005* (2016.01)
  *G07D 7/1205* (2016.01)

(56) References Cited

U.S. PATENT DOCUMENTS

2021/0187992 A1* 6/2021 Özyigit ............ G07B 17/00435
2021/0323337 A1* 10/2021 Peters .................. B42D 25/313
2022/0041005 A1* 2/2022 Kecht .................. G07D 7/1205
2023/0062072 A1* 3/2023 Walter ................ G07D 7/0032

* cited by examiner

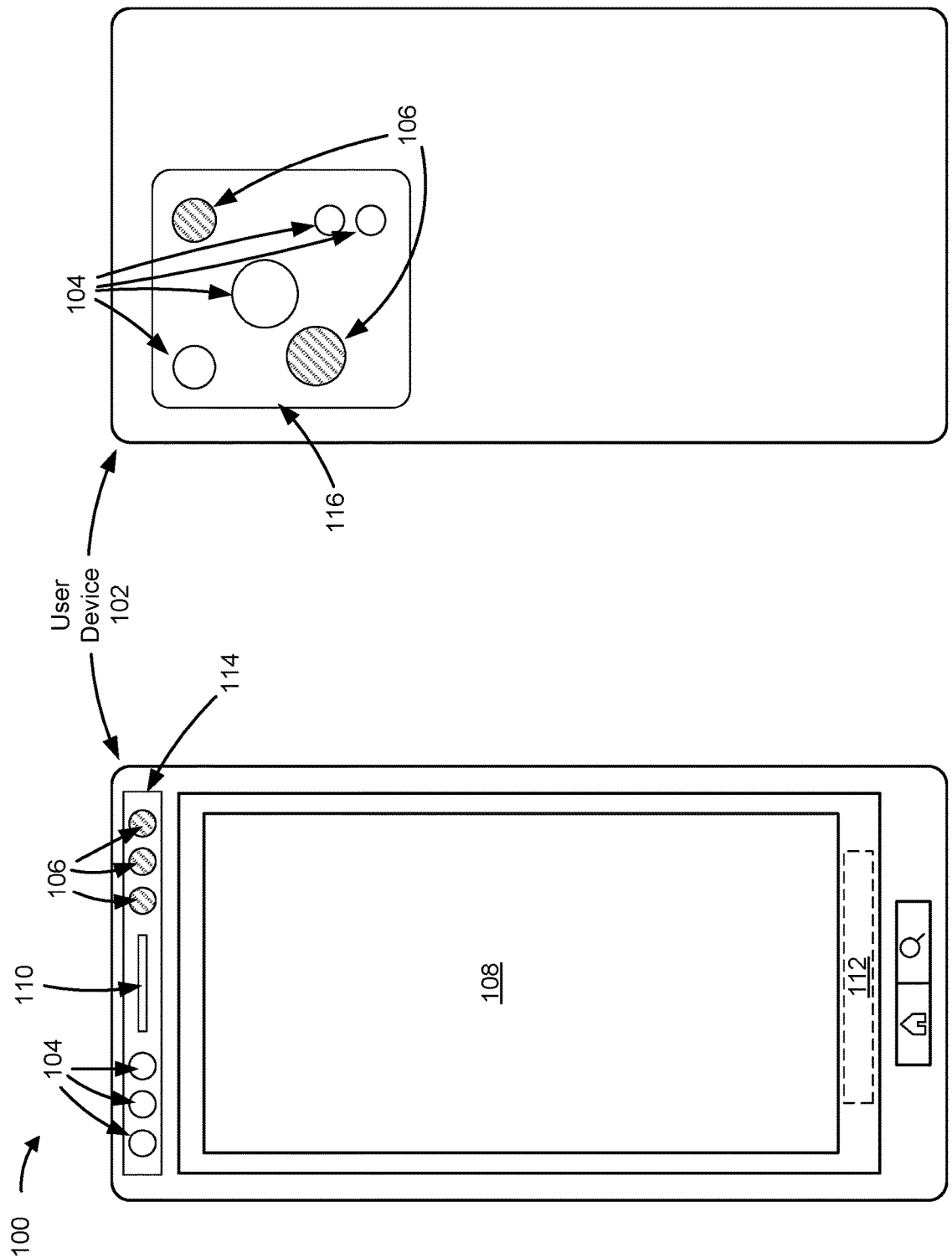

SECURITY ARTICLE AUTHENTICATION

RELATED APPLICATION

This application claims priority to U.S. Provisional Patent Application No. 63/217,956, filed on Jul. 2, 2021, and entitled "SECURITY ARTICLE AUTHENTICATION," the content of which is incorporated by reference herein in its entirety.

BACKGROUND

Some documents, such as monetary instruments, identity documents, and other documents of value, may include one or more security or authentication features to combat counterfeiting. For example, a surface of a document may include an application of magnetic ink that includes magnetically aligned magnetic flakes to create an optical feature (e.g., a color-shifting feature or a reflectivity feature).

SUMMARY

Some implementations described herein relate to a method. The method may include causing, by a user device, light to be emitted at a security article by one or more light emission devices of the user device. The method may include obtaining, by the user device, from a first set of one or more optical sensor devices of a plurality of optical sensor devices of the user device, and based on causing the light to be emitted, first sensor data associated with the security article. The method may include obtaining, by the user device, from a second set of one or more optical sensor devices of the plurality of optical sensor devices of the user device, and based on causing the light to be emitted, second sensor data associated with the security article. The method may include determining, by the user device and based on the first sensor data and the second sensor data, identification information associated with the security article. The method may include identifying, by the user device and based on the first sensor data and the second sensor data, a security feature of the security article. The method may include determining, by the user device and based on identifying the security feature of the security article, one or more characteristics of the security feature. The method may include determining, by the user device and based on the identification information associated with the security article and the one or more characteristics of the security feature, whether the security article is authentic. The method may include causing, based on determining whether the security article is authentic, one or more actions to be performed.

Some implementations described herein relate to a user device. The user device may include one or more memories and one or more processors coupled to the one or more memories. The user device may be configured to cause light to be emitted at a security article by one or more light emission devices of the user device. The user device may be configured to obtain from a first set of one or more optical sensor devices of a plurality of optical sensor devices of the user device, and based on causing the light to be emitted, first sensor data associated with the security article. The user device may be configured to obtain from a second set of one or more optical sensor devices of the plurality of optical sensor devices of the user device, and based on causing the light to be emitted, second sensor data associated with the security article. The user device may be configured to determine, based on the first sensor data and the second sensor data, one or more characteristics of a security feature of the security article. The user device may be configured to determine, based on the one or more characteristics of the security feature, whether the security article is authentic. The user device may be configured to cause, based on determining whether the security article is authentic, one or more actions to be performed.

Some implementations described herein relate to a non-transitory computer-readable medium that stores a set of instructions for a user device. The set of instructions, when executed by one or more processors of the user device, may cause the user device to cause light to be emitted at a security article by one or more light emission devices of the user device. The set of instructions, when executed by one or more processors of the user device, may cause the user device to obtain, from a plurality of optical sensor devices of the user device, and based on causing the light to be emitted, sensor data associated with the security article. The set of instructions, when executed by one or more processors of the user device, may cause the user device to determine, based on the sensor data, one or more characteristics of a security feature of the security article. The set of instructions, when executed by one or more processors of the user device, may cause the user device to determine, based on the one or more characteristics of the security feature, whether the security article is authentic. The set of instructions, when executed by one or more processors of the user device, may cause the user device to cause, based on determining whether the security article is authentic, one or more actions to be performed.

BRIEF DESCRIPTION OF THE DRAWINGS

FIGS. 1A-1C are diagrams of an example implementation described herein.

DETAILED DESCRIPTION

Figure 1C:
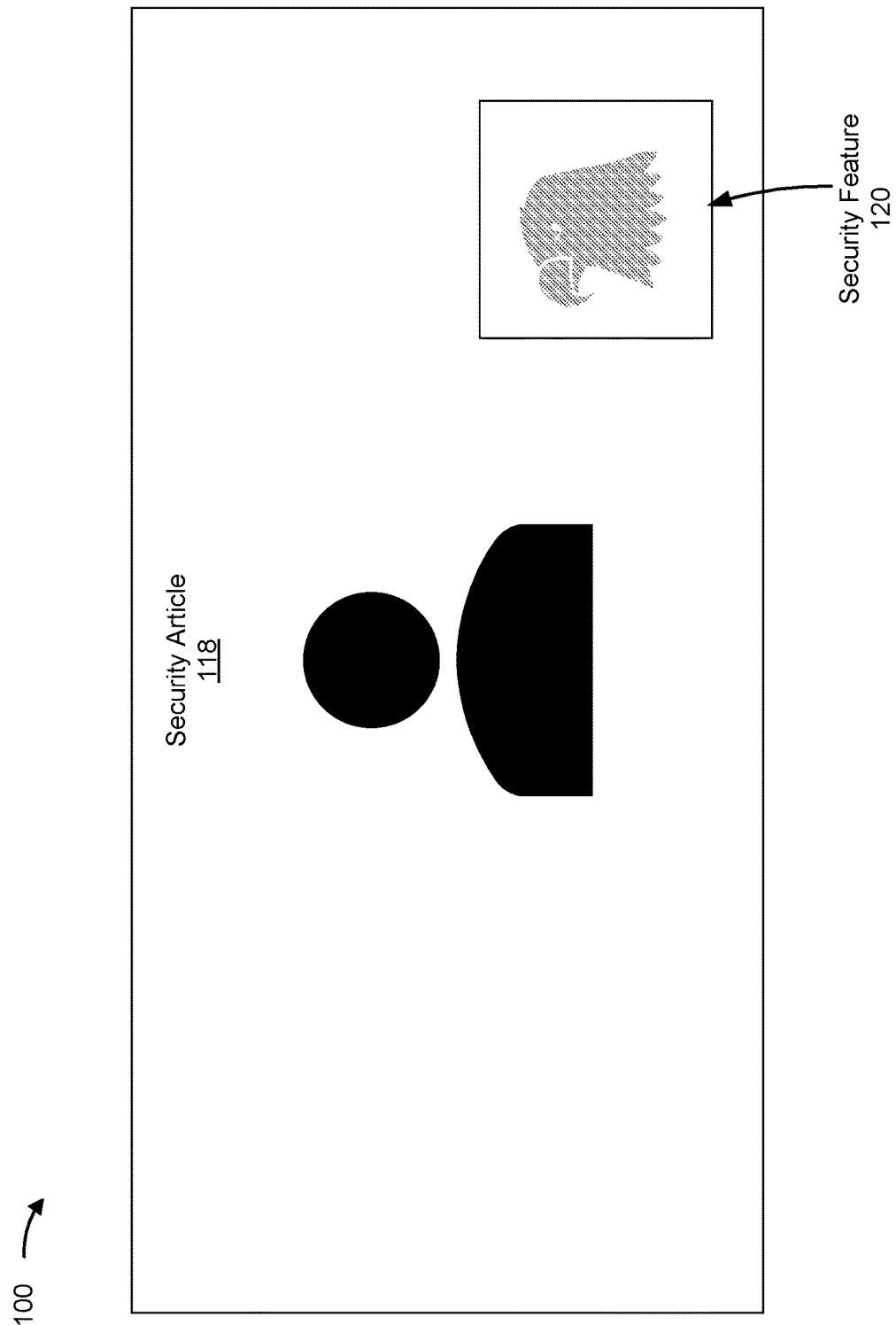

The following detailed description of example implementations refers to the accompanying drawings. The same reference numbers in different drawings may identify the same or similar elements.

In some cases, a document, such as paper currency, may include one or more security or authentication features, such as a watermark or a pattern printed with color shifting ink, on a region of the document. A person may directly inspect, or may use an authentication device, to analyze the document to determine that the one or more optical security features are present in the document. Based on identifying the one or more optical security features, the person, or the authentication device, may determine that the document is genuine. For example, a person may view a watermark in a dollar bill and may conclude that the dollar bill is not counterfeit. However, as advanced printing technology becomes more widely available (e.g., beyond government organizations or security-providing companies), a security feature may be able to be reproduced (or a facsimile security feature that appears to be similar to the security feature may be produced), which enables counterfeiting of the document and increases a likelihood that the counterfeit document is deemed legitimate.

Some implementations described herein provide a user device that includes one or more light emission devices and a plurality of optical sensor devices (e.g., camera devices). The user device may cause the one or more light emission devices to emit light at a security article that includes a security feature. The light may be associated with one or more spectral ranges (e.g., an ultraviolet (UV) spectral range, a visual spectral range, and/or an infrared (IR) spectral range). A first set of one or more optical sensor devices and a second set of one or more optical sensor devices, of the plurality of optical sensor devices, may be configured to respectively detect light associated with a first spectral range and a second spectral range. Accordingly, the user device may obtain (e.g., based on causing the light to be emitted), from the first set of one or more optical sensor devices, first sensor data associated with the security article (e.g., in association with the first spectral range), and, from the second set of one or more optical sensor devices, second sensor data associated with the security article (e.g., in association with the second spectral range). Accordingly, the user device may process the first sensor data and the second sensor data to identify the security feature of the security article and to determine one or more characteristics of the security feature. The user device may therefore determine, based on the one or more characteristics of the security feature, whether the security article is authentic.

In this way, the user device assists a user of the user device in authenticating the security article, without using a separate authentication device. This makes it easier to authenticate security articles, which increases a likelihood that fraudulent security articles will be discovered (and therefore removed from circulation). Accordingly, use of technical resources, such as computing resources (e.g., processing resources, memory resources, communication resources, and/or power resources, among other examples) to investigate counterfeiting, scan potentially counterfeit security articles, identify counterfeit security articles, and/or analyze security articles, among other examples, may be reduced.

Further, some implementations described herein enable use of security features that include characteristics that are detectable outside a visual spectral range, and are therefore "invisible" to a human user. In this way a security feature may be "hidden" on a security article, by including characteristics that only the user device is able to detect and identify. This reduces a likelihood that the security feature can be fraudulently reproduced, which decreases a likelihood of counterfeiting of the security article.

Additionally, some implementations described herein include providing visual, audible, and/or haptic information for enabling the user device to perform an authentication process of the security article. This assists visually impaired users, who may not otherwise be able to authenticate the security article.

FIGS. 1A-1C are diagrams of an example implementation 100 described herein. As shown in FIGS. 1A-1B, example implementation 100 includes a user device 102. FIG. 1A shows a front view of the user device 102 and FIG. 1B shows a back view of the user device 102. The user device 102 may include a plurality of optical sensor devices 104, one or more light emission devices 106, a display screen 108, an audio component 110, and/or a haptic component 112.

Each optical sensor device 104, of the plurality of optical sensor devices 104, may include, for example, an image sensor (e.g., an imaging "camera"), an ambient light sensor, a spectral sensor, a proximity sensor, a time-of-flight sensor, and/or one or more arrays of any of the preceding optical sensor devices. Each optical sensor device 104 may include a silicon (Si) based sensor, an indium-gallium-arsenide (InGaAs) based sensor, a lead-sulfide (PbS) based sensor, or a germanium (Ge) based sensor, and/or may utilize one or more sensor technologies, such as a complementary metal-oxide-semiconductor (CMOS) technology, or a charge-coupled device (CCD) technology, among other examples. In some implementations, optical sensor device 104 may include a front-side illumination (FSI) sensor, a back-side illumination (BSI) sensor, and/or the like.

Each optical sensor device 104 may be configured to detect light associated with a spectral range (e.g., a light wavelength range). For example, an optical sensor device 104 may be configured to detect light associated with an ultraviolet (UV) spectral range (e.g., a range within 100 nanometers (nm) to 379 nm), a visible spectral range (e.g., a range within 380 nm to 779 nm), a near-infrared (NIR) spectral range (e.g., a range within 780 nm to 1399 nm), a short-wavelength infrared (SWIR) spectral range (e.g., a range within 1400 nm to 2999 nm), a mid-wavelength infrared (MWIR) spectral range (e.g., a range within 3000 nm to 7999 nm), and/or a long-wavelength infrared (LWIR) spectral range (e.g., a range within 8000 nm to 15000 nm), among other examples. In some implementations, a first optical sensor device 104 may be configured to detect light associated with a first spectral range and a second optical sensor device 104 may be configured to detect light associated with a second spectral range, wherein the first spectral range and the second spectral range are different (e.g., a minimum of the first spectral range is not equal to a minimum of the second spectral range and/or a maximum of the first spectral range is not equal to a maximum of the second spectral range), or, alternatively, the first spectral range and the second spectral range are the same (e.g., respective minimums and maximums of the first spectral range and the second spectral range are equal to each other). Upon detecting light associated with a particular spectral range, each optical sensor device 104 may generate sensor data associated with the particular spectral range. The sensor data may indicate an intensity of light associated with the particular spectral range that is incident on the optical sensor device 104 (e.g., active/inactive or a more granular indication of intensity). For example, the first optical sensor device 104 may generate sensor data associated with the first spectral range and the second optical sensor device 104 may generate sensor data associated with the second spectral range.

Each light emission device 106, of the one or more light emission devices 106 may include, for example, a halogen light, an incandescent light, a compact fluorescent (CFL) light, a laser, a light emitting diode (LED), a fluorescent light, a neon light, and/or one or more arrays of any of the above-mentioned light emission devices. Each light emission device 106 may be configured to emit light associated with a spectral range (e.g., a light wavelength range). For example, an emission device 106 may be configured to emit light associated with a UV spectral range, a visible spectral range, an NIR spectral range, an SWIR spectral range, an MWIR spectral range, and/or an LWIR spectral range, among other examples. In some implementations, a light emission device 106 may be configured to emit light associated with a broad spectral range, such as a range within 200 nm to 2000 nm. Additionally, or alternatively, a first light emission device 106 may be configured to emit light associated with a first spectral range and a second light emission device 106 may be configured to emit light associated with a second spectral range, wherein the first spectral range and the second spectral range are different (e.g., a minimum of the first spectral range is not equal to a minimum of the second spectral range and/or a maximum of the first spectral range is not equal to a maximum of the second spectral range), or, alternatively, the first spectral and the second spectral range are the same (e.g., respective minimums and maximums of the first spectral range and the second spectral range are equal to each other).

The display screen 108 may be a liquid crystal display (LCD) display screen, a light emitting diode (LED) display screen, or an organic light emitting diode (OLED) display screen, among other examples. The display screen 108 may be configured to emit light associated with a spectral range, such as a visible spectral range (e.g., to present visual information to a user of the user device 102). In some implementations, the display screen 108 may be configured to be a light emission device 106 of the one or more light emission devices 106. The audio component 110 may be, for example, a speaker and/or a buzzer (e.g., that are configured to present audible information to the user of the user device 102). The haptic component 112 may be, for example, a vibrator and/or an actuator (e.g., that are configured to present haptic information to the user of the user device 102).

In some implementations, the plurality of optical sensor devices 104 and the one or more light emission devices 106 may be disposed on an external surface of a side of the user device 102. For example, as shown in FIG. 1A, the plurality of optical sensor devices 104 and the one or more light emission devices 106 may be disposed in a component cluster 114 on an external surface of the front side of the user device 102, upon which the display screen 108 is also disposed. As another example, as shown in FIG. 1B, the plurality of optical sensor devices 104 and the one or more light emission devices 106 may be disposed in a component cluster 116 on an external surface of a back side of the user device. In some implementations, the plurality of optical sensor devices 104 may be arranged within a component cluster (component cluster 114 or component cluster 116), such that two optical sensor devices 104 are separated by a particular distance (e.g., that is indicated by configuration information that is accessible to the user device 102, as further described herein). As further shown in FIG. 1A, the haptic component 112 may be included in (e.g., integrated in) an internal environment of the user device 102.

As shown in FIG. 1C, the example implementation 100 may include a security article 118. The security article 118 may include currency, a bank note, a government issued identification card, a private organization identification card, a transaction card, an indication document (e.g., that indicates an author of the indication document; an originator, producer, or owner of a product or service associated with the indication document; and/or other information). As shown in FIG. 1C, the security article 118 may include a security feature 120. The security feature 120 may include, for example, a raised ink feature, a color-shifting ink feature, a fluorescent ink feature, a security thread feature, a watermark feature, a microprinting feature, a reflective feature, a refractive feature, a diffractive feature, a foil feature, a hologram feature, a window feature, an image feature, a graphic feature, a micro-optics feature, and/or a pattern feature. While FIG. 1C shows a single security feature 120 included in the security article 118, the security article may include multiple security features 120. In some implementations, a security feature 120 may be associated with one or more regions of a surface (or surfaces) of the security article 118 (e.g., the security feature 120 may span the one or more regions of the surface of the security article 118).

In some implementations, the security article 118 may be authentic (e.g., may be an authentic security article). For example, the security article 118 may be what the security article 118 purports to be (e.g., based on labeling or other indicators on the security article 118), such as currency, a bank note, a government issued identification card, a private organization identification card, a transaction card, and/or an indication document. Accordingly, the security feature 120 may include one or more characteristics (e.g., one or more optical characteristics and/or one or more composition characteristics, described herein) that indicate that the security article 118 is authentic (e.g., the one or more characteristics match expected characteristics of an authentic security article). Alternatively, in some implementations, the security article 118 may not be authentic (e.g., may be a fraudulent security article). For example, the security article 118 may not be what the security article 118 purports to be (e.g., based on labeling or other indicators on the security article 118). For example, the security article 118 may be counterfeit currency, a counterfeit bank note, a counterfeit government issued identification card, a counterfeit private organization identification card, a counterfeit transaction card, and/or a counterfeit indication document. Accordingly, the security feature 120 may include one or more characteristics (e.g., one or more optical characteristics and/or one or more composition characteristics, described herein) that indicate that the security article 118 is not authentic (e.g., the one or more characteristics do not match expected characteristics of an authentic security article).

As indicated above, FIGS. 1A-1C are provided as examples. Other examples may differ from what is described with regard to FIGS. 1A-1C.

Figure 2A:
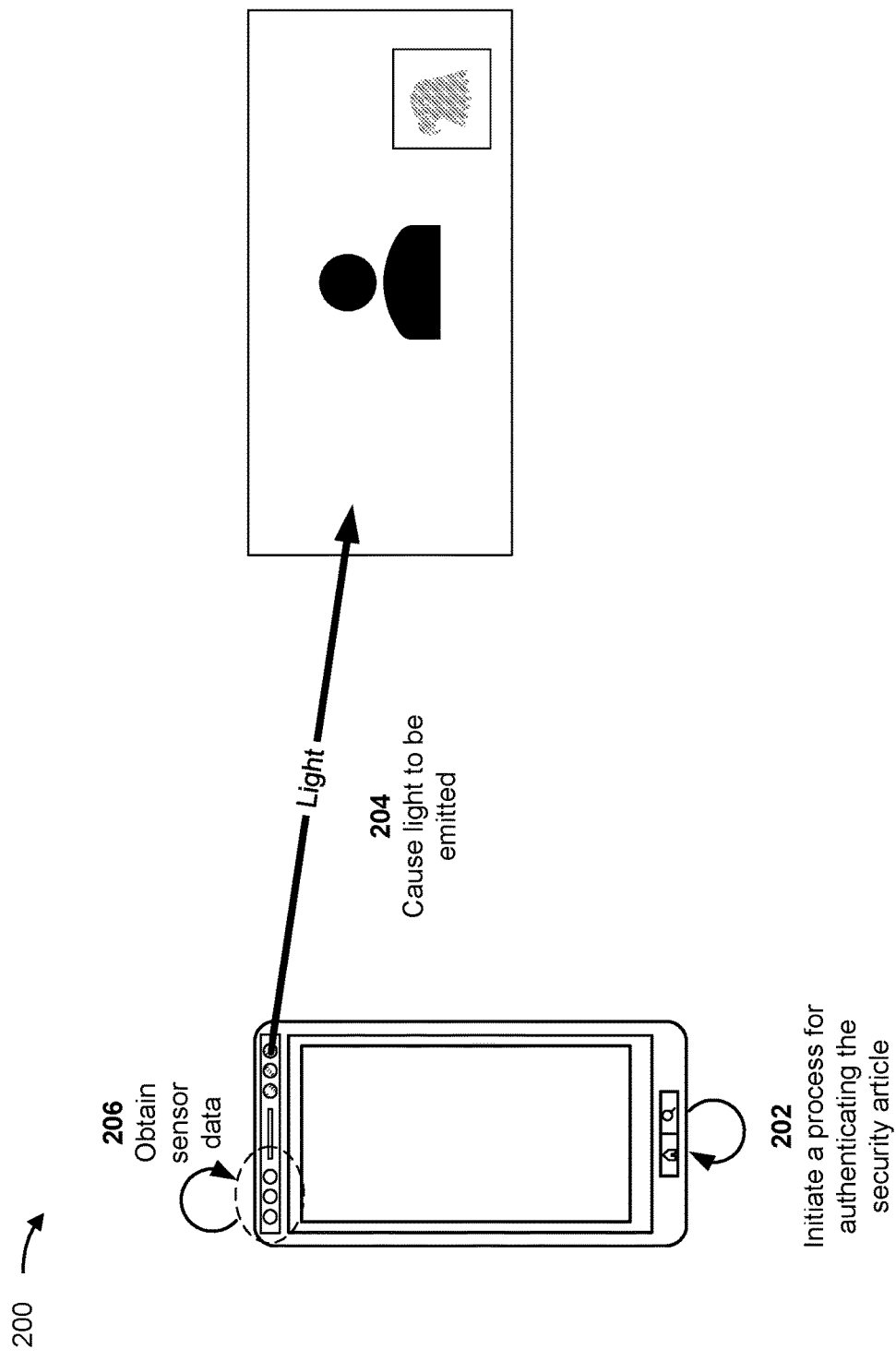
FIGS. 2A-2C are diagrams of an example implementation described herein.
Figure 2B:
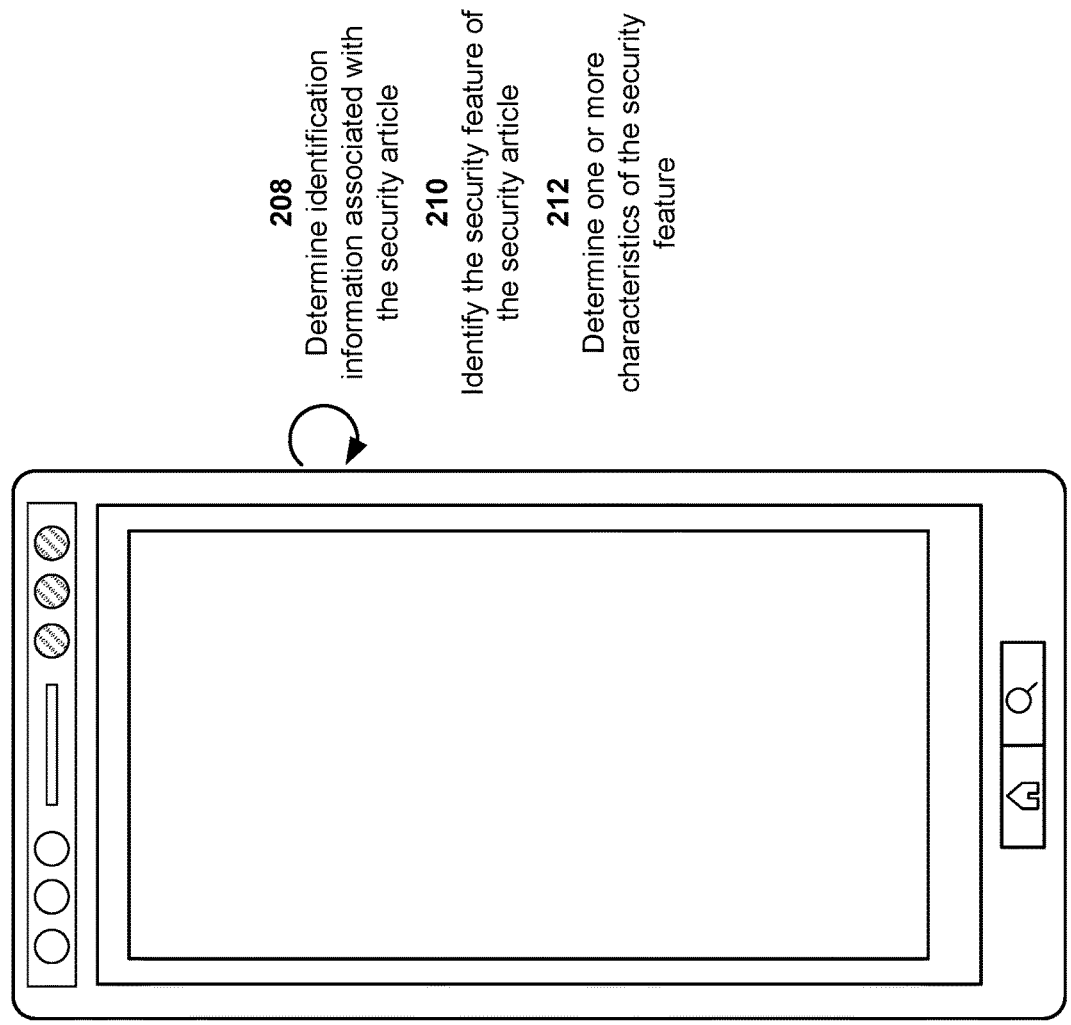
Figure 2C:
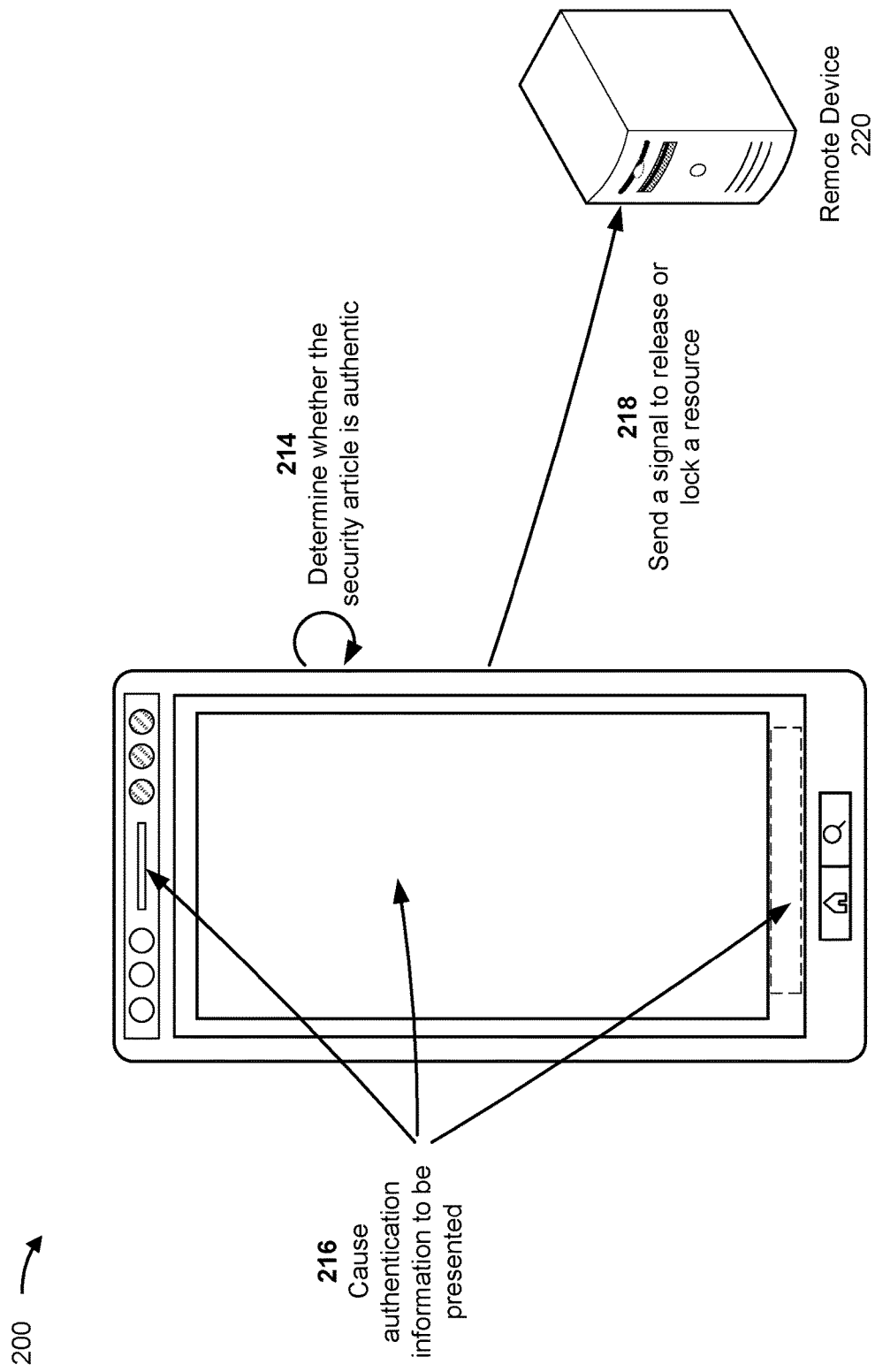

FIGS. 2A-2C are diagrams of an example implementation 200 described herein. As shown in FIGS. 2A-2C, the user device 102 may perform one or more processing steps related to authenticating the security article 118 (e.g., determining whether the security article is an authentic security article or a fraudulent security article).

As shown in FIG. 2A, and by reference number 202, the user device 102 may initiate a process for authenticating the security article 118. For example, a user of the user device 102 may interact with a user interface of the user device 102 to cause an application (e.g., that is configured to facilitate authenticating security articles) to run on the user device 102. The user device 102, when running the application, may provide, to the user of the user device 102, one or more prompts, such as one or more visual prompts (e.g., via the display screen 108), one or more audible prompts (e.g., via the audio component 110), and/or one or more haptic prompts (e.g., via the haptic component 112), to present the security article 118 to the user device 102. For example, the user device 102 may instruct the user to position the security article 118 within respective fields of view of the plurality of optical sensor devices 104 (e.g., such that a particular surface, such as a front surface or a back surface, of the security article 118 is within the respective fields of view of the plurality of optical sensor devices 104). Accordingly, the user of the user device 102 may present the security article 118 to the user device 102 (e.g., by positioning the security article 118 to be within the respective fields of view of the plurality of optical sensor devices 104).

As further shown in FIG. 2A, and by reference number 204, the user device 102 (e.g., when running the application) may cause light to be emitted at the security article 118 by the one or more light emission devices 106 of the user device 102. For example, the user device 102 may send one or more signals to the one or more light emission devices 106 to cause the one or more light emission devices 106 of the user device 102 to emit the light at the security article 118. In some implementations, the user device 102 may cause the one or more light emission devices 106 of the user device 102 to emit light associated with one or more spectral ranges at the security article 118. For example, the user device 102 may send a first signal to the one or more light emission devices 106 to cause at least one light emission device 106 to emit light associated with a UV spectral range, a second signal to the one or more light emission devices 106 to cause at least one light emission device 106 to emit light associated with a visible spectral range, a third signal to the one or more light emission devices 106 to cause at least one light emission device 106 to emit light associated with an NIR spectral range, a fourth signal to the one or more light emission devices 106 to cause at least one light emission device 106 to emit light associated with an SWIR spectral range, a fifth signal to the one or more light emission devices 106 to cause at least one light emission device 106 to emit light associated with an MWIR spectral range, and/or a sixth signal to the one or more light emission devices 106 to cause at least one light emission device 106 to emit light associated with an LWIR spectral range. In some implementations, the user device 102 may cause the one or more light emission devices 106 of the user device 102 to emit light associated with the one or more spectral ranges at the security article 118 at the same time (e.g., during a same time range, or during two or more time ranges that at least partially overlap), or, alternatively at different times (e.g., at two or more time ranges that do not overlap).

As further shown in FIG. 2A, and by reference number 206, the user device 102 (e.g., when running the application) may obtain, from the plurality of optical sensor devices 104, sensor data associated with the security article 118 (e.g., based on causing light to be emitted at the security article 118 by the one or more light emission devices 106). For example, the user device 102 may obtain, from a first set of one or more optical sensor devices 104, of the plurality of optical sensor devices 104, first sensor data associated with the security article 118; the user device 102 may obtain, from a second set of one or more optical sensor devices 104, of the plurality of optical sensor devices 104, second sensor data associated with the security article 118; the user device 102 may obtain, from a third set of one or more optical sensor devices 104, of the plurality of optical sensor devices 104, third sensor data associated the security article 118; and/or so on. When the first set of one or more optical sensor devices 104 is configured to detect light associated with a first spectral range, the first sensor data may be associated with the first spectral range; when the second set of one or more optical sensor devices 104 is configured to detect light associated with a second spectral range, the second sensor data may be associated with the second spectral range; when the third set of one or more optical sensor devices 104 is configured to detect light associated with a third spectral range, the third sensor data may be associated with the third spectral range; and/or so on. In this way, the user device 102 may obtain sensor data (e.g., discrete sensor data) associated with the security article 118 for each spectral range, of one or more spectral ranges, that the plurality of optical sensor devices 104 are configured to detect.

In some implementations, the user device 102 may cause the plurality of optical sensor devices 104 to generate sensor data at a same time. For example, the user device 102 may send one or more signals to the plurality of optical sensor devices 104 to cause the plurality of optical sensor devices 104 to generate the sensor data during a same time range. In some implementations, the user device 102 may cause the plurality of optical sensor devices 104 to generate sensor data at different times. For example, the user device 102 may send a first signal to the first set of one or more optical sensor devices 104 to cause the first set of one or more optical sensor devices 104 to generate the first sensor data during a first time range; may send a second signal to the second set of one or more optical sensor devices 104 to cause the second set of one or more optical sensor devices 104 to generate the second sensor data during a second time range (e.g., that does not overlap with the first time range); may send a third signal to the third set of one or more optical sensor devices 104 to cause the third set of one or more optical sensor devices 104 to generate the third sensor data during a third time range (e.g., that does not overlap with the first time range and does not overlap with the second time range); and/or so on.

In some implementations, the user device 102 may cause the one or more light emission devices 106 of the user device 102 to emit light associated with a spectral range at a same time that the user device 102 causes a set of one or more optical sensor devices 104, that are configured to detect the spectral range, to generate sensor data associated with the spectral range. For example, the user device 102 may send respective control signals to the one or more light emission devices 106 and the first set of one or more optical sensor devices 104 to cause at least one light emission device 106 to emit light associated with a first spectral range during a first time range and to cause the first set of one or more optical sensor devices 104 to generate first sensor data associated with the first spectral range during the first time range; may send respective control signals to the one or more light emission devices 106 and the second set of one or more optical sensor devices 104 to cause at least one light emission device 106 to emit light associated with a second spectral range during a second time range and to cause the second set of one or more optical sensor devices 104 to generate second sensor data associated with the second spectral range during the second time range; may send respective control signals to the one or more light emission devices 106 and the third set of one or more optical sensor devices 104 to cause at least one light emission device 106 to emit light associated with a third spectral range during a third time range and to cause the third set of one or more optical sensor devices 104 to generate third sensor data associated with the third spectral range during the third time range; and/or so on. In this way, the user device 102 increases a likelihood that the security article 118 and the security feature 120 are illuminated with light associated with a particular spectral range when a set of one or more optical sensor devices 104 is to generate sensor data associated with the spectral range. Further, the set of one or more optical sensor devices 104 may generate more accurate sensor data associated with the spectral range than would be generated otherwise (e.g., because the light associated with the particular spectral range is not affected by interference or other optical issues that would result from other light associated with one or more other spectral ranges being emitted at the same time).

In some implementations, the user device 102 may cause the one or more light emission devices 106 of the user device 102 to emit light associated with a spectral range at a same time that the user device 102 causes a set of one or more optical sensor devices 104, that are configured to detect a different spectral range, to generate sensor data associated with the different spectral range. In this way, the set of one or more optical sensor devices 104 may generate sensor data related to a fluorescence effect associated with the security article 118 (e.g., when the security feature 120 of the security article 118 includes a fluorescent ink feature). In an example, the user device 102 may cause at least one light emission device 106 to emit light associated with a third spectral range (e.g., a UV spectral range) during a time range, and may cause the first set of one or more optical sensor devices 104 to generate first sensor data associated with a first spectral range (e.g., a visual spectral range) during the time range and the second set of one or more optical sensor devices 104 to generate second sensor data associated with a second spectral range (e.g., an NIR spectral range) during the time range. The third spectral range may be different than the first spectral range and the second spectral range.

As shown in FIG. 2B, and by reference number 208, the user device 102 (e.g., when running the application) may determine identification information associated with the security article 118 (e.g., based on the sensor data obtained by the user device 102). In some implementations, the user device 102 may process the sensor data (e.g., using one or more machine vision techniques, such as an object detection technique, an optical character recognition technique, and/or another machine vision technique) to determine the identification information. For example, the user device 102 may process first sensor data (e.g., that is associated with a first spectral range), second sensor data (e.g., that is associated with a second spectral range), third sensor data (e.g., that is associated with a third spectral range), and/or so on, that was obtained by the user device 102 (e.g., as described herein) to determine the identification information associated with the security article 118. The identification information associated with the security article 118 may include an identifier (e.g., a universally unique identifier (UUID), a text string, a number string, and/or an alphanumeric string, among other examples) associated with the security article 118, and the identifier may correspond to printed, displayed, and/or other information that is otherwise included in the security article 118.

As further shown in FIG. 2B, and by reference number 210, the user device 102 (e.g., when running the application) may identify the security feature 120 of the security article 118 (e.g., based on the sensor data obtained by the user device 102). In some implementations, the user device 102 may process the sensor data (e.g., using one or more machine vision techniques) to identify the security feature 120. For example, the user device 102 may process first sensor data (e.g., that is associated with a first spectral range), second sensor data (e.g., that is associated with a second spectral range), third sensor data (e.g., that is associated with a third spectral range), and/or so on, that was obtained by the user device 102 (e.g., as described herein) to identify the security feature 120. Additionally, or alternatively, the user device 102 may process the sensor data to identify at least one portion of the sensor data that is associated with the security feature 120 (e.g., at least one portion of the sensor data that is associated with one or more regions of a surface (or surfaces) of the security article 118 upon which the security feature 120 is disposed). For example, the user device 102 may process the first sensor data to identify at least one portion of the first sensor data that is associated with the security feature 120, the second sensor data to identify at least one portion of the second sensor data that is associated with the security feature 120, the third sensor data to identify at least one portion of the third sensor data that is associated with the security feature 120, and/or so on.

As further shown in FIG. 2B, and by reference number 212, the user device 102 (e.g., when running the application) may determine one or more characteristics of the security feature 120 (e.g., based on identifying the security feature 120). The one or more characteristics may include, for example, one or more optical characteristics of the security feature 120 (e.g., one or more colors, such as of one or more inks of the security feature 120; one or more dimensions, such as respective heights, widths, and/or thicknesses of one or more inks, security threads, and/or other features of the security feature 120; one or more reflective characteristics; one or more refractive characteristics; one or more diffractive characteristics; and/or one or more fluorescent characteristics) and/or one or more composition characteristics of the security feature 120 (e.g., one or more chemical compositions, such as of one or more inks, security threads, and/or other features of the security feature; one or more composition ratios, such as composition ratios of one or more colors, materials, or other components of the security feature 120), among other examples. As a first specific example, when the security feature 120 includes a color-shifting ink feature, the one or more characteristics may include respective colors of the color-shifting ink feature at one or more different viewing angles. As a second specific example, when the security feature 120 includes a reflective feature, the one or more characteristics may include respective reflectivity values of the reflective feature for one or more spectral ranges.

In some implementations, the user device 102 may process the sensor data (e.g., using one or more machine learning models) to identify the one or more characteristics of the security feature 120. For example, the user device 102 may process the first sensor data (e.g., that is associated with a first spectral range), the second sensor data (e.g., that is associated with a second spectral range), the third sensor data (e.g., that is associated with a third spectral range), and/or so on, to identify the one or more characteristics of the security feature 120. With regard to the first specific example above, the user device 102 may process the first sensor data (e.g., in association with configuration information that indicates a distance between the first set of one or more optical sensor devices 104 and the second set of one or more optical sensor devices 104) to determine a first color of the security feature 120 at a first viewing angle, may process the second sensor data (e.g., in association with the configuration information) to determine a second color of the security feature 120 at a second viewing angle, and/or so on. With regard to the second specific example above, the user device 102 may process the first sensor data to determine a first reflectivity value of the reflective feature for the first spectral range, may process the second sensor data to determine a second reflectivity value of the reflective feature for the second spectral range, and/or so on.

Additionally, or alternatively, the user device 102 may process the at least one portion of the sensor data that is associated with the security feature 120 (e.g., using the one or more machine learning models) to identify the one or more characteristics of the security feature 120. For example, the user device 102 may process the at least one portion of the first sensor data, the at least one portion of the second sensor data, the at least one portion of the third sensor data, and/or so on, to identify the one or more characteristics of the security feature 120. In this way, when processing the at least one portion of the sensor data, rather than all of the sensor data, to identify the one or more characteristics of the security feature 120, the user device 102 may use fewer computing resources (e.g., processing resources, memory resources, communication resources, and/or power resources, among other examples) of the user device 102, which improves a performance of the user device 102.

As shown in FIG. 2C, and by reference number 214, the user device 102 (e.g., when running the application) may determine whether the security article 118 is authentic (e.g., based on determining the identification information associated with the security article, based on identifying the security feature 120, and/or based on identifying the one or more characteristics of the security feature 120). For example, the user device 102 may process (e.g., using one or more machine learning models) the identification information associated with the security article 118, information identifying the security feature 120, and/or information identifying the one or more characteristics of the security feature 120 to determine whether the security article 118 is authentic.

As another example, the user device 102 may search, based on the identification information associated with the security article 118, a data structure (e.g., a database, an electronic folder, an electronic table, or another data structure) that stores security article authentication information for an entry associated with the security article 118. The entry may include characteristic information associated with the security feature 120 of the security article 118. The user device 102 may compare the characteristic information and the one or more characteristics of the security feature 120 (e.g., identified by the user device 102, as described elsewhere herein) to determine whether the security article 118 is authentic. In some implementations, to make a comparison, the user device 102 may determine whether the characteristic information matches the one or more characteristics (e.g., is the same as, or is similar to, the one or more characteristics). With regard to the first specific example above, when the security feature 120 includes a color-shifting ink feature, the user device 102 may determine whether the characteristic information (e.g., that indicates a color-shift property of the color-shifting ink feature at one or more different viewing angles) matches the one or more characteristics (e.g., that includes respective colors of the color-shifting ink feature at one or more different viewing angles). With regard to the second specific example above, when the security feature 120 includes a reflective feature, the user device 102 may determine whether the characteristic information (e.g., that indicates a reflectivity of the reflective feature for one or more spectral ranges) matches the one or more characteristics (e.g., that includes respective reflectivity values of the reflective feature for one or more spectral ranges). The user device 102 may determine that the security article 118 is authentic when the user device 102 determines that the characteristic information matches the one or more characteristics. Alternatively, the user device 102 may determine that the security article 118 is not authentic when the user device 102 determines that the characteristic information does not match the one or more characteristics.

In some implementations, the user device 102 (e.g., when running the application) may cause (e.g., based on determining whether the security article 118 is authentic) one or more actions to be performed. For example, as shown by reference number 216, the user device 102 may cause authentication information indicating whether the security article 118 is authentic to be presented to the user of the user device 102. For example, the user device 102 may cause the authentication information to be visually displayed via the display screen 108, audibly presented via the audio component 110, and/or haptically presented via the haptic component 112. The information may indicate whether the security article 118 is or is not fraudulent, whether the security article 118 can be or cannot be used for a transaction, whether a holder of the security article 118 can or cannot access a restricted area, and/or whether a locked resource is to be unlocked or to remain locked, among other examples.

In some implementations, the user device 102 may cause (e.g., based on determining whether the security article 118 is authentic) granting or denying access to a resource (e.g., a prescription drug, a hazardous material, and/or a restricted area, among other examples). For example, as shown by reference number 218, when the user device 102 determines that the security article 118 is authentic, the user device 102 may send a signal to a remote device 220 associated with the resource to cause the remote device 220 to release the resource or otherwise allow a holder of the security article 118 access to the resource. As another example, when the user device 102 determines that the security article 118 is not authentic, the user device 102 may send a signal to the remote device 220 associated with the resource to cause the remote device 220 to lock the resource (or to maintain a lock on the resource) or otherwise prevent a holder of the security article 118 from accessing the resource.

As indicated above, FIGS. 2A-2C are provided as examples. Other examples may differ from what is described with regard to FIGS. 2A-2C.

Figure 3:
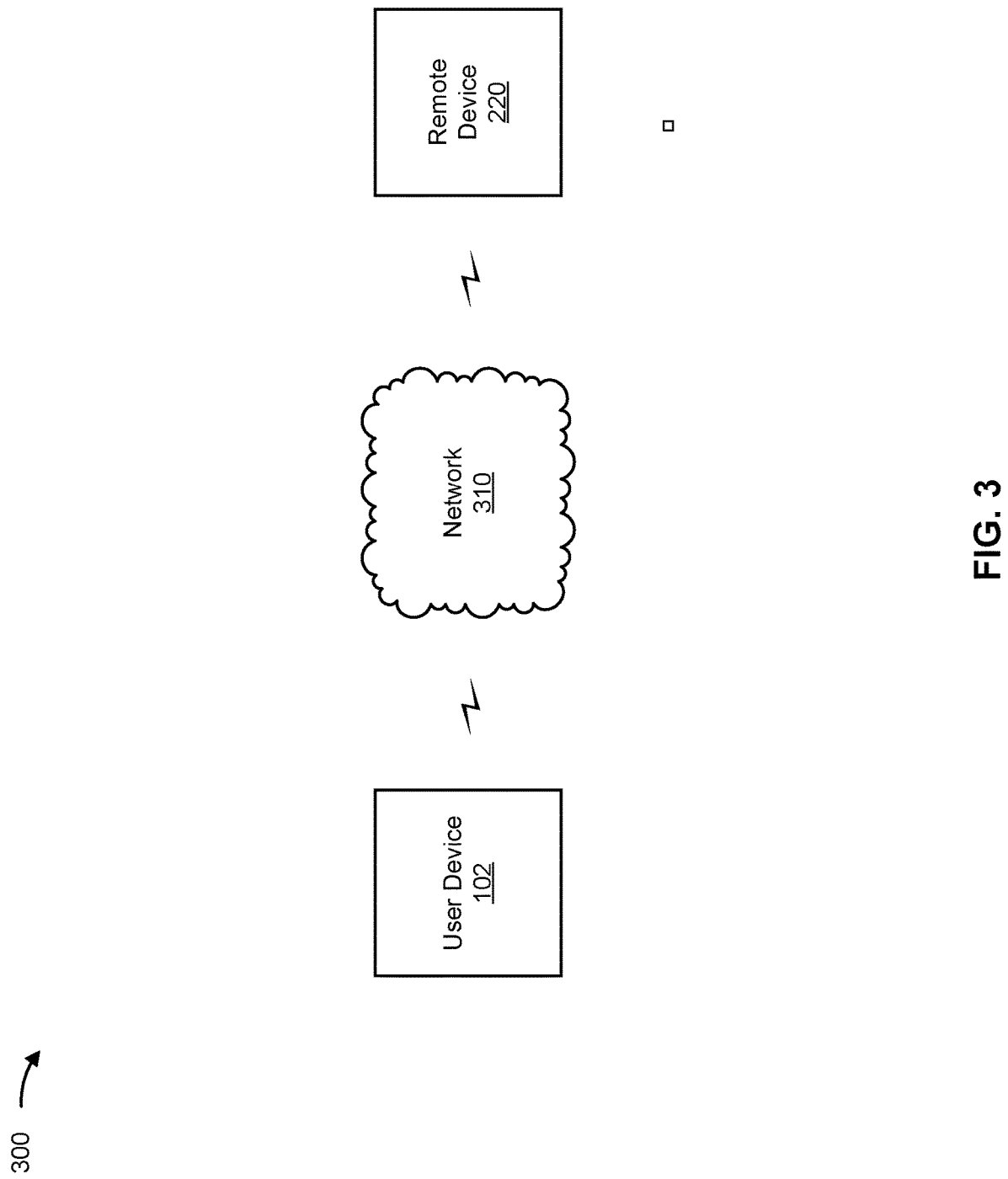
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include the user device 102, the remote device 220, and a network 310. Devices of environment 300 may interconnect via wired connections, wireless connections, or a combination of wired and wireless connections.

The user device 102 includes one or more devices capable of receiving, generating, storing, processing, and/or providing information associated with security article authentication, as described elsewhere herein. The user device 102 may include a communication device and/or a computing device. For example, the user device 102 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. In some implementations, the user device 102 may receive information from and/or transmit information to another device in environment 300, such as the remote device 220.

The remote device 220 includes one or more devices capable of receiving, generating, storing, processing, and/or providing security article authentication, as described elsewhere herein. The remote device 220 may include a communication device and/or a computing device. For example, the remote device 220 may include a wireless communication device, a mobile phone, a user equipment, a laptop computer, a tablet computer, a desktop computer, a server, such as an application server, a client server, a web server, a database server, a host server, a proxy server, a virtual server (e.g., executing on computing hardware), a server in a cloud computing system, a device that computing hardware used in a cloud computing environment, or a similar type of device.

The network 310 includes one or more wired and/or wireless networks. For example, the network 310 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 310 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
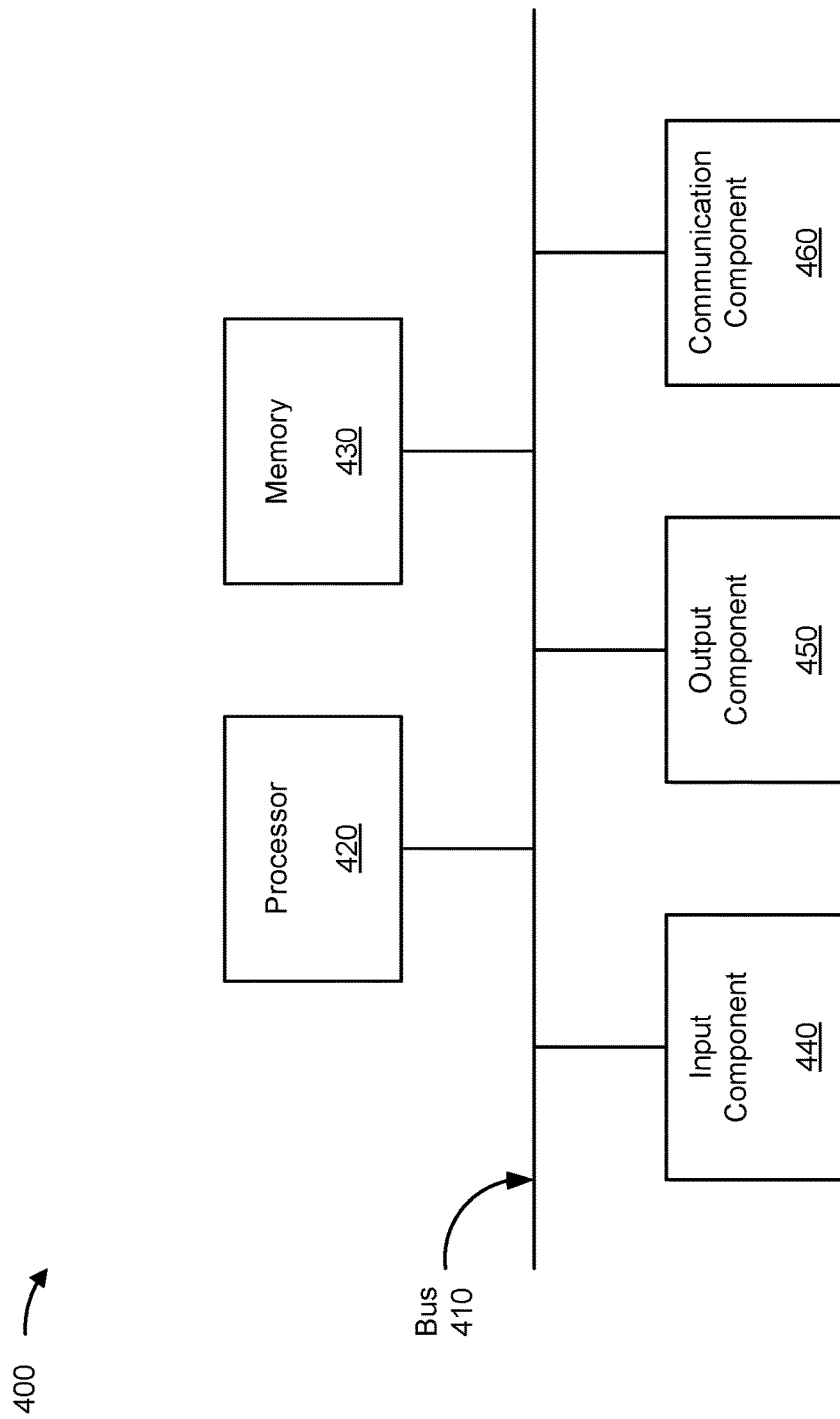
FIG. 4 is a diagram of example components of a device associated with security article authentication.

FIG. 4 is a diagram of example components of a device 400 associated with security article authentication. Device 400 may correspond to the user device 102 and/or the remote device 220. In some implementations, the user device 102 and/or the remote device 220 include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
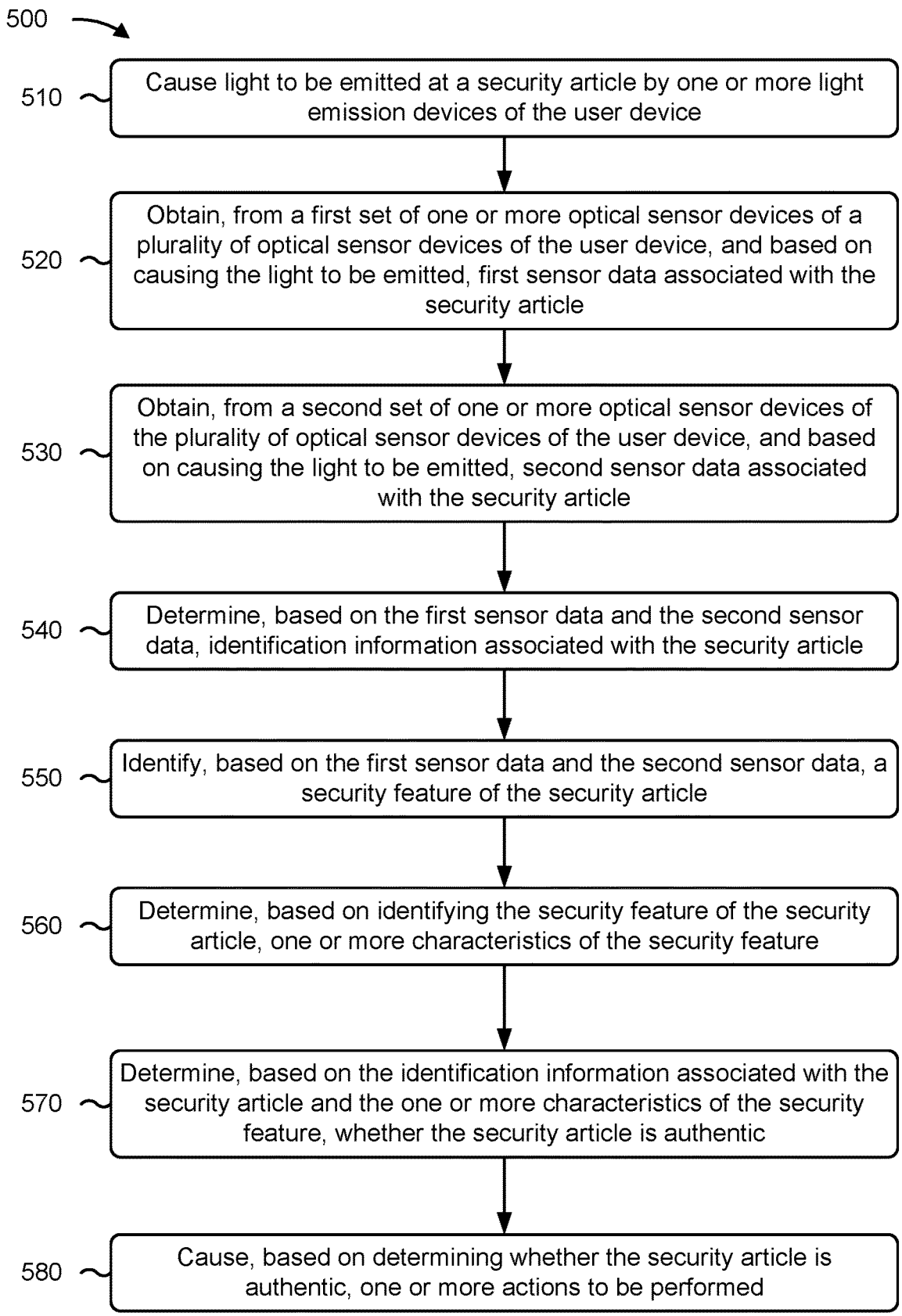
FIG. 5 is a flowchart of an example process associated with security article authentication.

FIG. 5 is a flowchart of an example process 500 associated with security article authentication. In some implementations, one or more process blocks of FIG. 5 are performed by a user device (e.g., user device 102). In some implementations, one or more process blocks of FIG. 5 are performed by another device or a group of devices separate from or including the user device, such as a remote device (e.g., remote device 220). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include causing light to be emitted at a security article by one or more light emission devices of the user device (block 510). For example, the user device may cause light to be emitted at a security article by one or more light emission devices of the user device, as described above.

As further shown in FIG. 5, process 500 may include obtaining from a first set of one or more optical sensor devices of a plurality of optical sensor devices of the user device, and based on causing the light to be emitted, first sensor data associated with the security article (block 520). For example, the user device may obtain from a first set of one or more optical sensor devices of a plurality of optical sensor devices of the user device, and based on causing the light to be emitted, first sensor data associated with the security article, as described above.

As further shown in FIG. 5, process 500 may include obtaining from a second set of one or more optical sensor devices of the plurality of optical sensor devices of the user device, and based on causing the light to be emitted, second sensor data associated with the security article (block 530). For example, the user device may obtain from a second set of one or more optical sensor devices of the plurality of optical sensor devices of the user device, and based on causing the light to be emitted, second sensor data associated with the security article, as described above.

As further shown in FIG. 5, process 500 may include determining, based on the first sensor data and the second sensor data, identification information associated with the security article (block 540). For example, the user device may determine, based on the first sensor data and the second sensor data, identification information associated with the security article, as described above.

As further shown in FIG. 5, process 500 may include identifying, based on the first sensor data and the second sensor data, a security feature of the security article (block 550). For example, the user device may identify, based on the first sensor data and the second sensor data, a security feature of the security article, as described above.

As further shown in FIG. 5, process 500 may include determining, based on identifying the security feature of the security article, one or more characteristics of the security feature (block 560). For example, the user device may determine, based on identifying the security feature of the security article, one or more characteristics of the security feature, as described above.

As further shown in FIG. 5, process 500 may include determining, based on the identification information associated with the security article and the one or more characteristics of the security feature, whether the security article is authentic (block 570). For example, the user device may determine, based on the identification information associated with the security article and the one or more characteristics of the security feature, whether the security article is authentic, as described above.

As further shown in FIG. 5, process 500 may include causing, based on determining whether the security article is authentic, one or more actions to be performed (block 580). For example, the user device may cause, based on determining whether the security article is authentic, one or more actions to be performed, as described above.

Process 500 may include additional implementations, such as any single implementation or any combination of implementations described below and/or in connection with one or more other processes described elsewhere herein.

In a first implementation, the security feature includes at least one of a raised ink feature, a color-shifting ink feature, a fluorescent ink feature, a security thread feature, a watermark feature, a microprinting feature, a reflective feature, a refractive feature, a diffractive feature, a foil feature, a hologram feature, a window feature, an image feature, a graphic feature, or a pattern feature.

In a second implementation, alone or in combination with the first implementation, the first sensor data is associated with a first spectral range and the second sensor data is associated with a second spectral range, wherein the first spectral range and the second spectral range are different (e.g., the first sensor data and the second sensor data are associated with different spectral ranges).

In a third implementation, alone or in combination with one or more of the first and second implementations, the light is associated with the first spectral range and the second spectral range.

In a fourth implementation, alone or in combination with one or more of the first through third implementations, the light is associated with a third spectral range, and the third spectral range is different than the first spectral range and the second spectral range.

In a fifth implementation, alone or in combination with one or more of the first through fourth implementations, the first set of one or more optical sensor devices generates the first sensor data during a first time range, the second set of one or more optical sensor devices generates the second sensor data during a second time range, and the first time range and the second time range at least partially overlap.

In a sixth implementation, alone or in combination with one or more of the first through fifth implementations, the first set of one or more optical sensor devices generates the first sensor data during a first time range, the second set of one or more optical sensor devices generates the second sensor data during a second time range, and the first time range and the second time range do not overlap.

In a seventh implementation, alone or in combination with one or more of the first through sixth implementations, determining the one or more characteristics of the security feature comprises processing at least one portion of the first sensor data associated with the security feature of the security article and at least one portion of the second sensor data associated with the security feature of the security article to determine the one or more characteristics of the security feature.

In an eighth implementation, alone or in combination with one or more of the first through seventh implementations, causing the one or more actions to be performed comprises causing at least one of: causing authentication information indicating whether the security article is authentic to be visually displayed via a display screen of the user device, causing the authentication information to be audibly presented via an audio component of the user device, or causing the authentication information to be haptically presented via a haptic component of the user device.

In an ninth implementation, alone or in combination with one or more of the first through eighth implementations, causing the one or more actions to be performed comprises granting or denying access to a resource based on determining whether the security article is authentic.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    causing, by a mobile phone, light to be emitted at a security article by a plurality of light emission devices disposed in a component cluster on an external surface of a back side of the mobile phone,
        wherein a first light emission device, of the plurality of light emission devices, is caused to emit a first portion, of the light, associated with a first spectral range, and
        wherein a second light emission device, of the plurality of light emission devices, is caused to emit a second portion, of the light, associated with a second spectral range;
    obtaining, by the mobile phone, from a first set of one or more optical sensor devices of a plurality of optical sensor devices disposed in the component cluster on the external surface of the back side of the mobile phone, and based on causing the first portion of the light to be emitted, first sensor data associated with the security article;
    obtaining, by the mobile phone, from a second set of one or more optical sensor devices of the plurality of optical sensor devices disposed in the component cluster on the external surface of the back side of the mobile phone, and based on causing the second portion of the light to be emitted, second sensor data associated with the security article;
    determining, by the mobile phone and based on the first sensor data and the second sensor data, identification information associated with the security article;
    identifying, by the mobile phone and based on the first sensor data and the second sensor data, a security feature of the security article;
    determining, by the mobile phone and based on identifying the security feature of the security article, one or more characteristics of the security feature;
    determining, by the mobile phone and based on the identification information associated with the security article and the one or more characteristics of the security feature, whether the security article is authentic; and
    causing, based on determining whether the security article is authentic, one or more actions to be performed.

2. The method of claim 1, wherein the security feature includes at least one of:
    a raised ink feature,
    a color-shifting ink feature,
    a fluorescent ink feature,
    a security thread feature,
    a watermark feature,
    a microprinting feature,
    a reflective feature,
    a refractive feature,
    a diffractive feature,
    a foil feature,
    a hologram feature,
    a window feature,
    an image feature,
    a graphic feature,
    a micro-optic feature, or
    a pattern feature.

3. The method of claim 1, wherein the first spectral range and the second spectral range do not overlap.

4. The method of claim 1, wherein the first spectral range and the second spectral range partially overlap.

5. The method of claim 1, wherein a third portion, of the light, is associated with a third spectral range, and
    wherein the third spectral range is different than the first spectral range and the second spectral range.

6. The method of claim 1, wherein:
    the first set of one or more optical sensor devices generates the first sensor data during a first time range;
    the second set of one or more optical sensor devices generates the second sensor data during a second time range; and
    the first time range and the second time range at least partially overlap.

7. The method of claim 1, wherein:
    the first set of one or more optical sensor devices generates the first sensor data during a first time range;
    the second set of one or more optical sensor devices generates the second sensor data during a second time range; and
    the first time range and the second time range do not overlap.

8. The method of claim 1, wherein determining the one or more characteristics of the security feature comprises:
    processing at least one portion of the first sensor data associated with the security feature of the security article and at least one portion of the second sensor data associated with the security feature of the security article to determine the one or more characteristics of the security feature.

9. The method of claim 1, wherein causing the one or more actions to be performed comprises at least one of:
  causing authentication information indicating whether the security article is authentic to be visually displayed via a display screen of the mobile phone;
  causing the authentication information to be audibly presented via an audio component of the mobile phone; or
  causing the authentication information to be haptically presented via a haptic component of the mobile phone.

10. A mobile device, comprising:
  a plurality of light emission devices disposed in a component cluster on an external surface of a back side of the mobile device;
  a plurality of optical sensor devices disposed in the component cluster on the external surface of the back side of the mobile device;
  one or more memories; and
  one or more processors, coupled to the one or more memories, configured to cause the mobile device to:
    cause a first light emission device, of the plurality of light emission devices disposed in the component cluster on the external surface of the back side of the mobile device, to emit, at a security article, light associated with a first spectral range;
    cause a second light emission device, of the plurality of light emission devices disposed in the component cluster on the external surface of the back side of the mobile device, to emit light associated with a second spectral range;
    obtain from a first set of one or more optical sensor devices of the plurality of optical sensor devices disposed in the component cluster on the external surface of the back side of the mobile device, and based on the light associated with the first spectral range being emitted, first sensor data associated with the security article;
    obtain from a second set of one or more optical sensor devices of the plurality of optical sensor devices disposed in the component cluster on the external surface of the back side of the mobile device, and based on the light associated with the second spectral range being emitted, second sensor data associated with the security article;
    determine, based on the first sensor data and the second sensor data, one or more characteristics of a security feature of the security article;
    determine, based on the one or more characteristics of the security feature, whether the security article is authentic; and
    cause, based on whether the security article is authentic, one or more actions to be performed.

11. The mobile device of claim 10, wherein:
  the first set of one or more optical sensor devices is configured to generate the first sensor data during a first time range;
  the second set of one or more optical sensor devices is configured to generate the second sensor data during a second time range; and
  the first time range and the second time range at least partially overlap.

12. The mobile device of claim 10, wherein:
  the first set of one or more optical sensor devices is configured to generate the first sensor data during a first time range;
  the second set of one or more optical sensor devices is configured to generate the second sensor data during a second time range; and
  the first time range and the second time range do not overlap.

13. The mobile device of claim 10, wherein the one or more processors, to determine the one or more characteristics of the security feature, are configured to:
  process at least one portion of the first sensor data associated with the security feature of the security article and at least one portion of the second sensor data associated with the security feature of the security article to determine the one or more characteristics of the security feature.

14. The mobile device of claim 10, wherein the one or more processors, to cause the one or more actions to be performed, are configured to:
  grant or deny access to a resource based on whether the security article is authentic.

15. One or more non-transitory computer-readable media storing a set of instructions, the set of instructions comprising:
  one or more instructions that, when executed by one or more processors of a mobile device, cause the mobile device to:
    cause light to be emitted at a security article by one or more of a plurality of light emission devices disposed in a component cluster on an external surface of a back side of the mobile device;
    obtain, from a plurality of optical sensor devices disposed in the component cluster on the external surface of the back side of the mobile device, and based on the light being emitted, sensor data associated with the security article;
    determine, based on the sensor data, one or more characteristics of a security feature of the security article;
    determine, based on the one or more characteristics of the security feature, whether the security article is authentic; and
    cause, based on whether the security article is authentic, one or more actions to be performed.

16. The one or more non-transitory computer-readable media of claim 15, wherein the one or more instructions further cause:
  the plurality of optical sensor devices to generate a first portion of the sensor data during a first time range;
  the plurality of optical sensor devices to generate a second portion of the sensor data during a second time range; and
  the first time range and the second time range at least partially overlap.

17. The one or more non-transitory computer-readable media of claim 15, wherein the one or more instructions further cause:
  the plurality of optical sensor devices to generate a first portion of the sensor data during a first time range;
  the plurality of optical sensor devices to generate a second portion of the sensor data during a second time range; and
  the first time range and the second time range do not overlap.

18. The one or more non-transitory computer-readable media of claim 15, wherein the one or more instructions, that cause the user device to determine the one or more characteristics of the security feature, cause the mobile device to:
  process at least one portion of the sensor data associated with the security feature of the security article to determine the one or more characteristics of the security feature.

19. The mobile device of claim 10, wherein the first spectral range and the second spectral range do not overlap.

20. The one or more non-transitory computer-readable media of claim 15,
- wherein light is emitted at a first spectral range and a second spectral range, and
- wherein the first spectral range and the second spectral range do not overlap.

* * * * *